(12) United States Patent
Kondo et al.

(10) Patent No.: US 10,333,324 B2
(45) Date of Patent: Jun. 25, 2019

(54) CHARGER AND CHARGING METHOD

(71) Applicant: NEC Corporation, Tokyo (JP)

(72) Inventors: Yasuaki Kondo, Tokyo (JP); Daisuke Shigematsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 172 days.

(21) Appl. No.: 14/915,777

(22) PCT Filed: Sep. 10, 2014

(86) PCT No.: PCT/JP2014/073894
§ 371 (c)(1),
(2) Date: Mar. 1, 2016

(87) PCT Pub. No.: WO2015/053032
PCT Pub. Date: Apr. 16, 2015

(65) Prior Publication Data
US 2016/0218537 A1 Jul. 28, 2016

(30) Foreign Application Priority Data
Oct. 7, 2013 (JP) .................................. 2013-209976

(51) Int. Cl.
H02J 7/00 (2006.01)
H02J 7/02 (2016.01)
(Continued)

(52) U.S. Cl.
CPC ......... H02J 7/0047 (2013.01); B60L 11/1824 (2013.01); B60L 11/1848 (2013.01);
(Continued)

(58) Field of Classification Search
USPC .................................................. 320/106–115
See application file for complete search history.

(56) References Cited

U.S. PATENT DOCUMENTS 8,583,520 B1 * 11/2013 Forbes, Jr. ............. G05D 17/00
705/34
2006/0287763 A1 12/2006 Ochi et al.
(Continued)

FOREIGN PATENT DOCUMENTS

| CN | 201210314 Y | 3/2009 |
| CN | 102856951 A | 1/2013 |

(Continued)

OTHER PUBLICATIONS

International Search Report corresponding to PCT/JP2014/073894 dated Nov. 11, 2014 (2 pages).

(Continued)

Primary Examiner — Binh C Tat
(74) Attorney, Agent, or Firm — Wilmer Cutler Pickering Hale and Dorr LLP

(57) ABSTRACT

According to the present invention, in a charger for charging a secondary battery, in order to solve the problem that when usage fees are settled before the start of charging to prevent the nonpayment of usage fees, the possibility arises that the usage fees will be refunded, the usage fees of the charger are settled before the charging is completed. The charger (200) has: a power supply unit (210) that supplies electric power to a secondary battery; and a settlement unit (220) that settles the usage fees for using the charger after the supply of electric power to the secondary battery has started but before the termination of charging.

18 Claims, 5 Drawing Sheets

(51) Int. Cl.
*H02J 7/04* (2006.01)
*B60L 11/18* (2006.01)
*G06Q 20/14* (2012.01)
*G07F 15/00* (2006.01)

(52) U.S. Cl.
CPC ......... *G06Q 20/145* (2013.01); *G07F 15/005* (2013.01); *H02J 7/0052* (2013.01); *H02J 7/02* (2013.01); *H02J 7/04* (2013.01); *B60L 2230/16* (2013.01); *H02J 2007/0096* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2007/0136166 A1 | 6/2007 | Duncan |
| 2008/0040263 A1* | 2/2008 | Pollack ............... G06Q 20/10 705/39 |
| 2009/0066287 A1* | 3/2009 | Pollack ............... G06Q 50/00 320/101 |
| 2009/0106137 A1 | 4/2009 | Ochi et al. |
| 2009/0243549 A1 | 10/2009 | Matsumura et al. |
| 2010/0010685 A1 | 1/2010 | Kang |
| 2010/0156349 A1 | 6/2010 | Littrell |
| 2011/0057613 A1 | 3/2011 | Taguchi et al. |
| 2012/0203690 A1 | 8/2012 | Yang et al. |
| 2013/0147436 A1 | 6/2013 | Fukumoto |
| 2014/0055091 A1 | 2/2014 | Kondo et al. |
| 2015/0006343 A1 | 1/2015 | Sako et al. |

FOREIGN PATENT DOCUMENTS

| | | |
|---|---|---|
| EP | 1734635 A2 | 12/2006 |
| EP | 2202113 A2 | 6/2010 |
| EP | 2843613 B1 | 5/2017 |
| GB | 2496357 A | 5/2013 |
| JP | 2001-057711 A | 2/2001 |
| JP | 2004-222457 A | 8/2004 |
| JP | 2006-353042 A | 12/2006 |
| JP | 2010-004620 A | 1/2010 |
| JP | 2010-028913 A | 2/2010 |
| JP | 2010-250565 A | 11/2010 |
| JP | 2011-103048 A | 5/2011 |
| JP | 2012-050201 A | 3/2012 |
| JP | 2012-051085 A | 3/2012 |
| JP | 2012-070479 A | 4/2012 |
| JP | 2013-118716 A | 6/2013 |
| WO | WO-2012/029605 A1 | 3/2012 |
| WO | WO-2013/121724 A1 | 8/2013 |

OTHER PUBLICATIONS

Chinese Office Action issued in corresponding Chinese Patent Application No. 201480050753.1, dated Feb. 4, 2017, 15 pages.
Japanese Office Action issued in corresponding to Japanese Patent Application No. 2015-541490, dated Mar. 14, 2017, 4 pages.
Extended European Search Report issued by the European Patent Office for European Application No. 14851631.3 dated May 18, 2017 (7 pages).
Singapore Written Opinion and Search Report issued by the Intellectual Property Office of Singapore for Application No. 112016019085 dated Jul. 18, 2016 (9 pages).
Chinese Notification of the Second Office Action issued in Chinese Patent Application No. 201480050753.1, dated Nov. 3, 2017, 16 pages.

* cited by examiner

CHARGER AND CHARGING METHOD

CROSS-REFERENCE TO RELATED APPLICATIONS

This application is a national stage application of International Application No. PCT/JP2014/073894 entitled "Charger and Charging Method" filed on Sep. 10, 2014, which claims priority to Japanese Application No. 2013-209976 filed on Oct. 7, 2013, the disclosures of which are hereby incorporated by reference in their entirety.

TECHNICAL FIELD

The present invention relates to a technology for settling usage fees of a charger that carries out charging of a secondary battery.

BACKGROUND ART

In recent years, several techniques have been proposed for settling usage fees of EV (Electric Vehicle) chargers that carry out charging of secondary batteries that are mounted in EVs.

For example, a technique is disclosed in Patent Document 1 that enables charging of an EV after settling the usage fees of an EV charger.

LITERATURE OF THE PRIOR ART

Patent Documents

Patent Document 1: Japanese Unexamined Patent Application Publication No. 2010-028913

SUMMARY OF THE INVENTION

Problem to be Solved by the Invention

In a charger, it is difficult to determine whether charging is possible at the interface with a secondary battery until the stage in which electricity is actually flowing.

Essentially, when usage fees are settled before the start of charging to avoid the nonpayment of usage fees in a charger, the possibility arises that refunding of usage fees will occur.

It is an object of the present invention to provide a charger and a charging method that solve the problem of the occurrence of refunding of charger usage fees, which is the problem described hereinabove.

Means for Solving the Problem

The charger of the present invention includes:
a power supply unit that supplies electric power to a secondary battery; and
a settlement unit that settles usage fees of a charger after power supply to the secondary battery has started but before the termination of charging.

The charging method of the present invention is a charging method realized by a charger that charges of a secondary battery and includes:
a power supply step of supplying electric power to said secondary battery; and
a settlement step of settling usage fees of said charger after supplying electric power to the secondary battery has started but before the termination of charging.

Effect of the Invention

The present invention obtains the effect of eliminating instances where charger usage fees need to be refunded.

BEST MODE FOR CARRYING OUT THE INVENTION

An exemplary embodiment of the present invention is next described with reference to the accompanying drawings.

Figure 1:
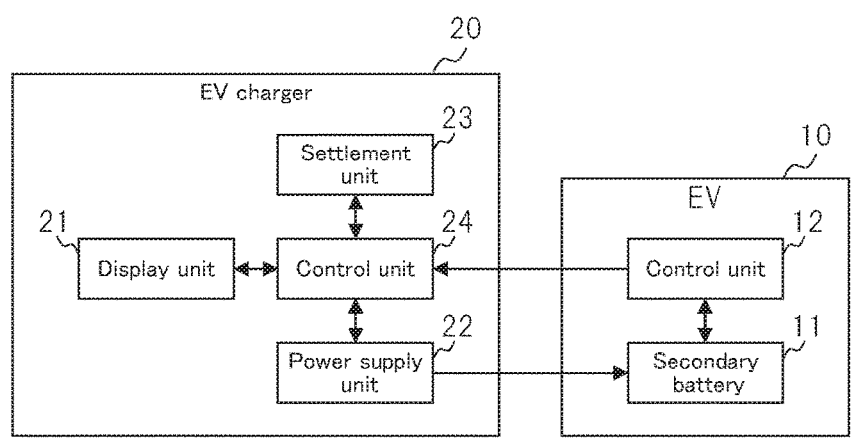
FIG. 1 is a block diagram showing the configuration of a charging system that includes an EV charger of an exemplary embodiment of the present invention.

FIG. 1 is a block diagram showing the configuration of a charging system that includes an EV charger of the present exemplary embodiment.

The charging system shown in FIG. 1 includes EV 10, and EV charger 20.

In the present exemplary embodiment, the charging mode of EV 10 is assumed to be a charging mode of the CHAdeMO (CHArge de MOve) standard. The CHAdeMO standard is a specification for controlling the start and termination of charging of EV charger 20 from the EV 10 side.

EV 10 includes secondary battery 11 and control unit 12.

Secondary battery 11 is charged by electric power supplied from EV charger 20. EV 10 is driven by electric power that is charged to secondary battery 11, but explanation is omitted because the drive system configuration itself is not an intrinsic part of the present invention and any known configuration can be used.

Control unit 12 controls the constituent elements in EV 10 to carry out various processes.

EV charger 20 includes display unit 21, power supply unit 22, settlement unit 23, and control unit 24.

Display unit 21 displays various screens during charging.

Power supply unit 22 supplies electric power to secondary battery 11 of EV 10.

Settlement unit 23 is capable of settling the fees for usage of EV charger 20 by EV 10 by a plurality of settlement methods. The settlement methods that can be implemented by settlement unit 23 include, for example, electronic money settlement, credit card settlement, prepaid card settlement, and cash settlement. The usage fees of EV charger 20 are assumed to be fixed charges regardless of the amount of electric power supplied.

Control unit 24 controls the constituent elements in EV charger 20 to carry out various processes.

The general operation of the charging system shown in FIG. 1 is next described.

The general operation during charging of the charging system shown in FIG. 1 is first described with reference to FIG. 2.

Figure 2:
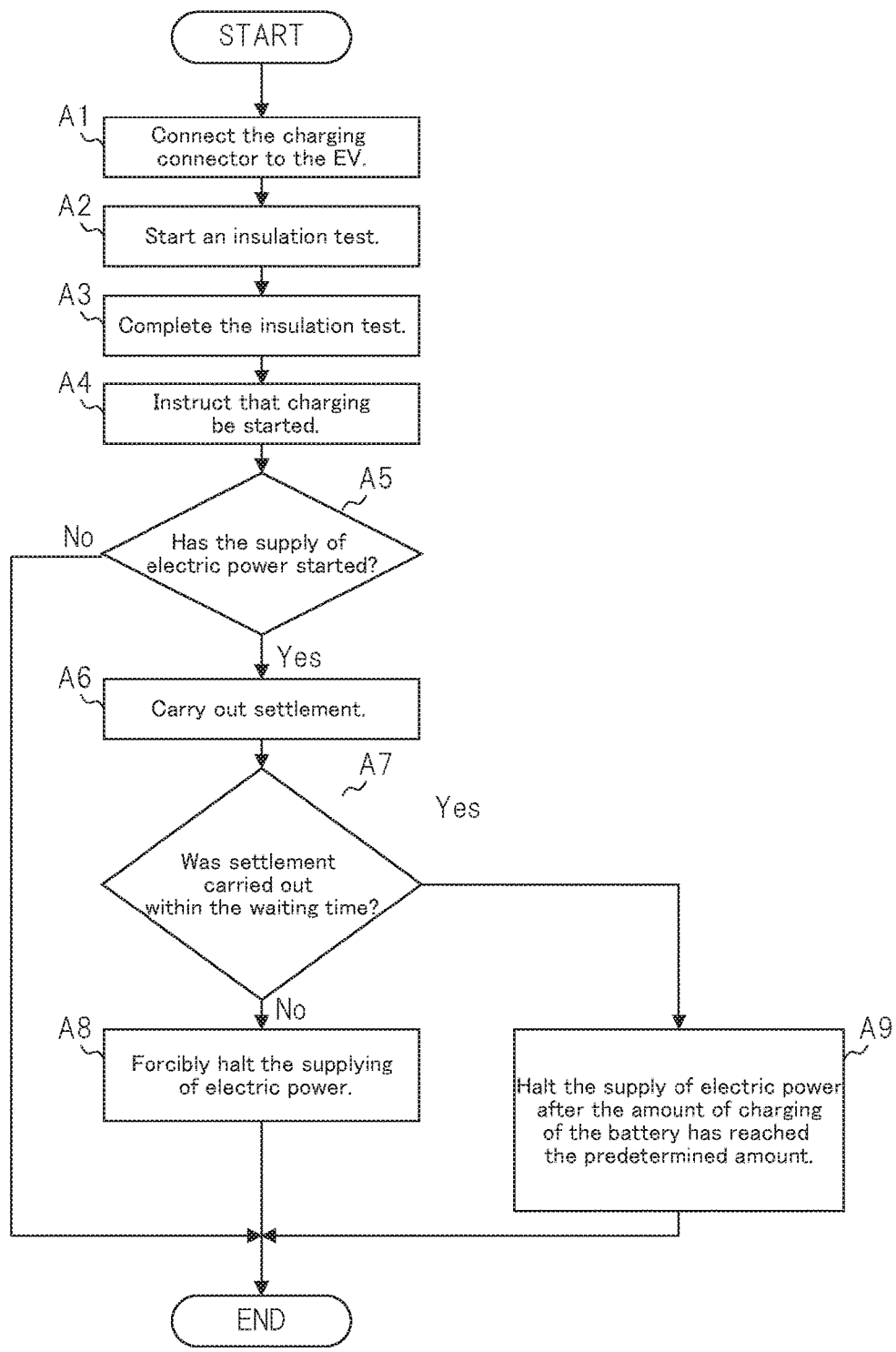
FIG. 2 is a flow chart for describing the general operations during charging in the charging system shown in FIG. 1.

As shown in FIG. 2, the charging connector of EV charger 20 is first connected to EV 10 by the user of EV charger 20 (Step A1).

Control unit 24 of EV charger 20 next begins an insulation test of the charging cable between the main part of EV charger 20 and the charging connector (Step A2). Because the insulation test method itself is not an intrinsic part of the present invention and a known method can be used, explanation is omitted. Once the insulation test starts, plugging and unplugging of the charging connector is not possible.

When the insulation test is completed (Step A3), control unit 12 of EV 10 instructs EV charger 20 to start charging (Step A4). Upon receiving this instruction, control unit 24 of EV charger 20 instructs power supply unit 22 to start the supplying of electric power to EV 10.

Control unit 24 of EV charger 20 next checks whether the supplying of electric power to EV 10 has actually started (Step A5). This is because, as described hereinabove, determination of whether charging is possible is difficult until the stage in which electric power is actually flowing.

If the supplying of electric power to EV 10 has started ("Yes" in Step A5), control unit 24 of EV charger 20 instructs settlement unit 23 to settle the usage fees of EV charger 20 (Step A6) and monitors whether settlement has been implemented within a waiting time (a time interval is set depending on the settlement method, to be described in detail hereinbelow) (Step A7). The starting point of the waiting time is assumed to be the timing at which the supplying electric power from the charging connector of EV charger 20 to EV 10 is started.

If settlement is not implemented within the waiting time ("No" in Step A7), control unit 24 of EV charger 20 instructs power supply unit 22 to forcibly halt the supplying of electric power to EV 10 (Step A8).

On the other hand, if settlement is implemented within the waiting time ("Yes" in Step A7), control unit 12 of EV 10 instructs EV charger 20 to terminate charging (Step A9) at the time point at which the charge amount of secondary battery 11 reaches a predetermined amount (the time point at which the charging rate of secondary battery 11 reaches 80% in the case of a rapid charger). Upon receiving this instruction, control unit 24 of EV charger 20 instructs power supply unit 22 to halt the supplying of electric power to EV 10.

After charging has terminated in Steps A8 and A9, the plugging and unplugging of the charging connector again becomes possible. Further, if the supplying of electric power to EV 10 did not start in Step A5, this is taken as an error, and the plugging and unplugging of the charging connector becomes possible.

The detailed operation during charging in EV charger 20 shown in FIG. 1 is next described with reference to FIGS. 3 and 4. The sequence diagrams of FIGS. 3 and 4 are linked together by way of connectors A-H.

Figure 3:
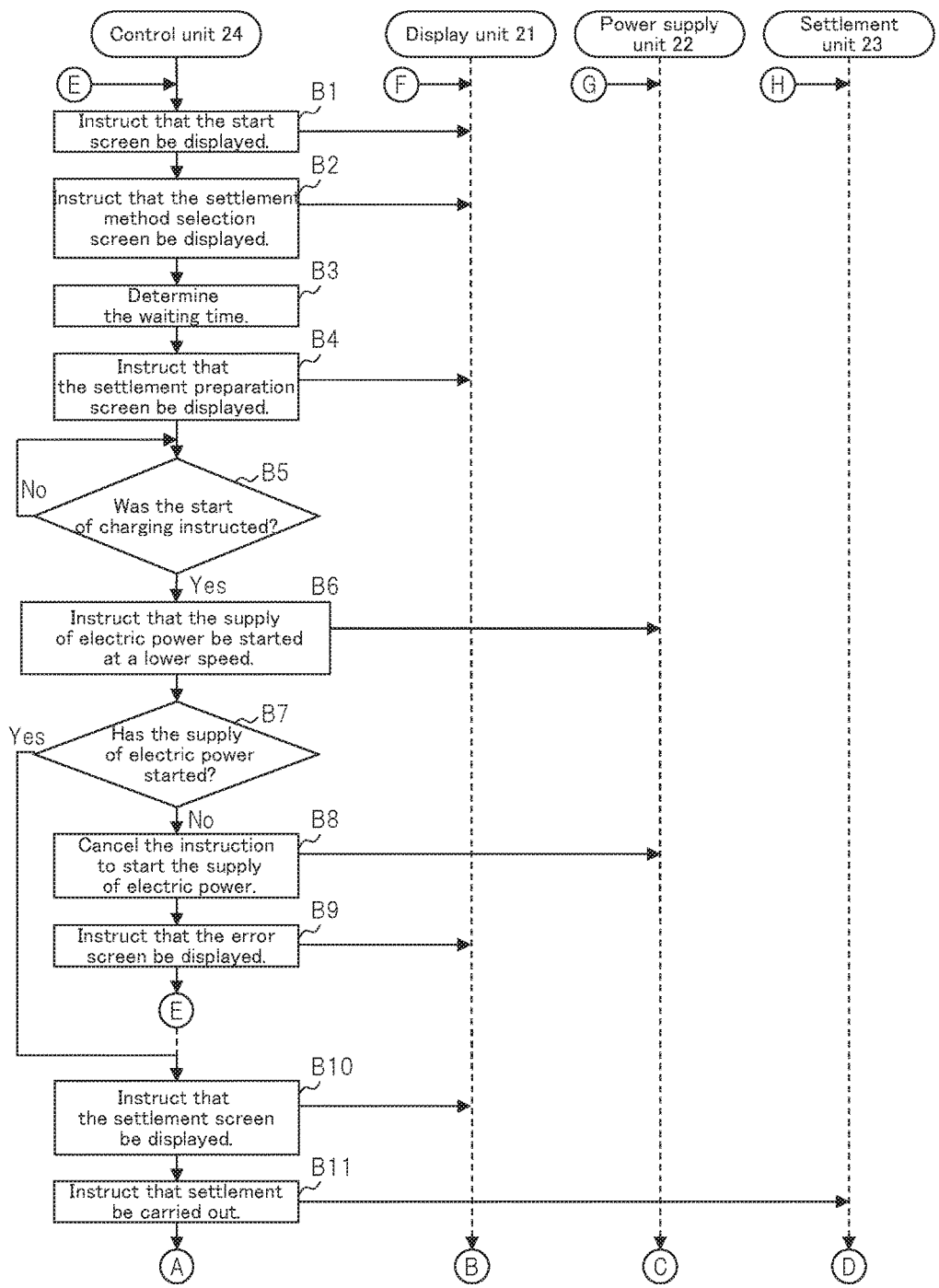
FIG. 3 is a sequence diagram for describing the details of operation during charging in the EV charger shown in FIG. 1.
Figure 4:
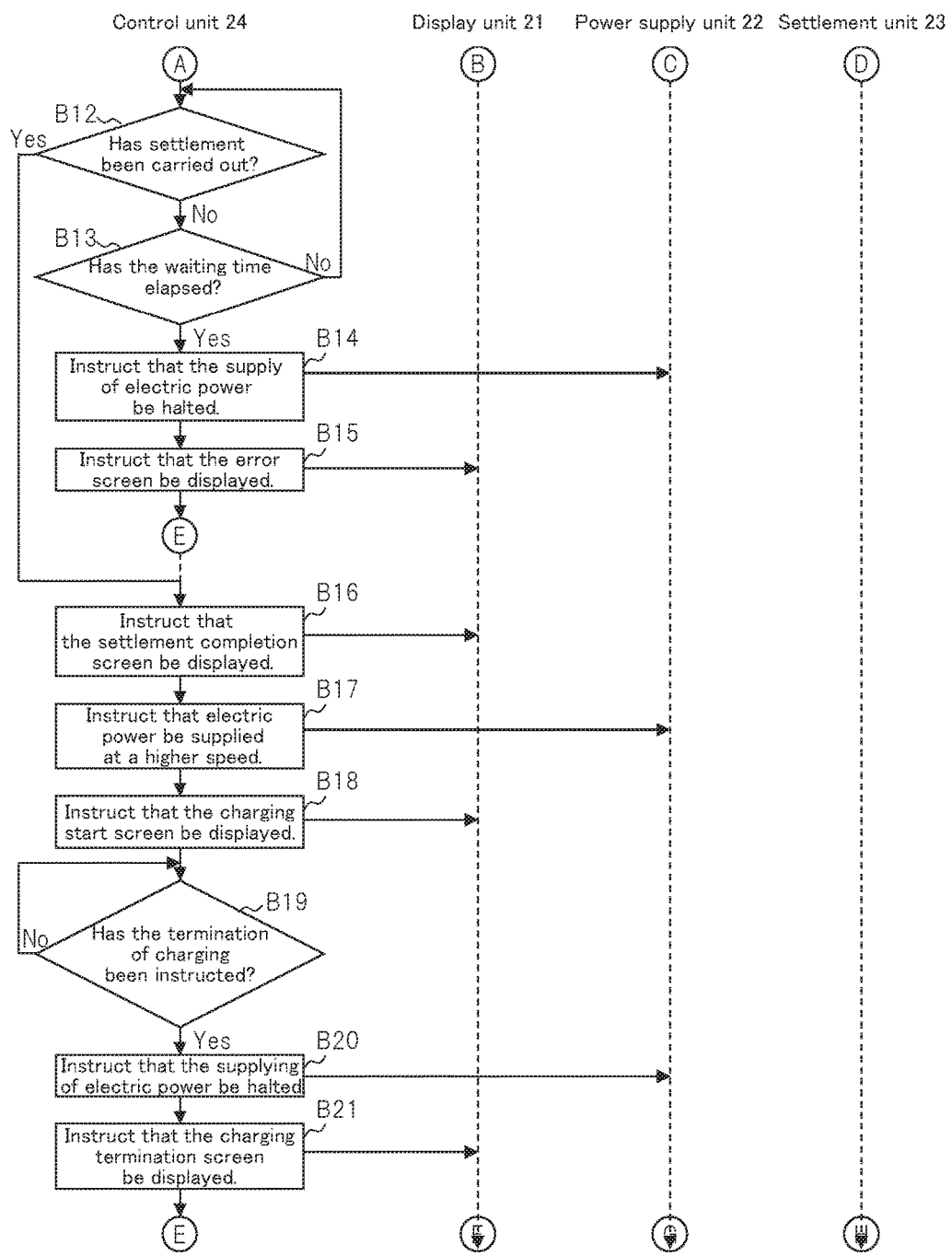
FIG. 4 is a sequence diagram for describing the details of operation during charging in the EV charger shown in FIG. 1.

As shown in FIGS. 3 and 4, control unit 24 first instructs display unit 21 to display the start screen (Step B1). Upon receiving this instruction, display unit 21 displays the start screen. The charging connector of EV charger 20 at this time point is not connected to EV 10.

When carrying out charging, the user of EV charger 20 first touches the start screen.

Control unit 24 next instructs display unit 21 to display the settlement method selection screen that prompts the user to select any one of the settlement methods that can be implemented by settlement unit 23 (Step B2). Upon receiving this instruction, display unit 21 displays the settlement method selection screen. In the settlement method selection screen, a plurality of settlement methods such as electronic money settlement, credit card settlement, prepaid card settlement, and cash settlement are displayed to allow the user to select, for example, touching the screen.

In the present exemplary embodiment, if settlement has not been carried out within the waiting time after the supplying of electric power to EV 10 has started, the charging is forcibly halted as described hereinabove.

In this way, the amount of electric power supplied to EV 10 for which usage fees have not been paid can be limited, but in order to further limit this amount of supplied electric power, the waiting time must be made as short as possible. However, the time until settlement is made is considered to differ depending on the settlement method (for example, in electronic money settlement, settlement is considered to be carried out in a shorter time than for cash settlement).

Control unit 24 therefore determines the waiting time according to the settlement method that was selected on the settlement method selection screen (Step B3).

In addition, the waiting time is set in advance for each settlement method and is set to within a range of, for example, 30 seconds to one minute. In other words, because the charging time is about 20 to 30 minutes in the case of rapid charging, the waiting time is set to about 5 to 10% of the total charging time.

In addition, when the waiting time is determined by the SOC (State Of Charge), the waiting time is set to the time in which the SOC is charged to about 5-10%.

However, because the "charging time" and "SOC that is charged according to time" vary by the amount of charge that remains in secondary battery 11, the waiting time is not necessarily limited to 5-10% of the charging time or about 5-10% of the SOC. In addition, the waiting time and the time taken in rapid charging are not limited to the times described above.

From the standpoint of limiting the amount of power supplied to EV 10 for which usage fees have not been paid, the waiting time is set to the shortest possible time according to the settlement method, but when settlement cannot be realized within this waiting time, the supplying of electric power to EV 10 may be halted.

In order that settlement can be immediately carried out within a short waiting time, control unit 24 instructs display unit 21 to display the settlement preparation screen that prompts the user to prepare for settlement by the settlement method that was selected in the settlement method selection screen (Step B4). Upon receiving this instruction, display unit 21 displays the settlement preparation screen. This settlement preparation screen is a screen displaying a message such as "Settlement will soon begin."

The charging connector of EV charger 20 is subsequently connected to EV 10 and the insulation test is carried out, but the explanation of these operations is here omitted. As described hereinabove, when the insulation test is started, a state begins in which plugging and unplugging of the charging connector is not possible.

When the insulation test is subsequently completed and the instruction to start charging is received from EV 10 ("Yes" in Step B5), control unit 24 instructs power supply unit 22 to begin the supplying of electric power to EV 10. The timing of the start of the supply of electric power to EV 10 from the charging connector of EV charger 20 is the starting point of the waiting time. At this time, control unit 24 instructs power supply unit 22 to select a first speed that is a low speed (for example, the minimum speed) as the electric power supply rate that indicates the amount of electric power to be supplied per unit time to EV 10 (Step B6). Upon receiving this instruction, power supply unit 22 performs a trial run by attempting to start the supplying of electric power to EV 10 after reducing the power supply speed to the first speed.

Control unit 24 next checks whether the supplying of electric power to EV 10 has actually started (Step B7).

If the supplying of electric power to EV 10 has not started ("No" in Step B7), control unit 24 instructs power supply unit 22 to cancel the instruction to start the supplying electric power (Step B8). Upon receiving this instruction, power supply unit 22 stops the trial run of supplying electric power to EV 10.

In addition, control unit 24 instructs display unit 21 to display an error screen that indicates that charging was not carried out (Step B9). Upon receiving this instruction, display unit 21 displays the error screen. After displaying this error screen, unplugging and plugging of the charging connector again becomes possible, the process again returns to Step B1, and the start screen is again displayed.

On the other hand, if the supply of electric power to EV 10 begins ("Yes" in Step B7), control unit 24 instructs display unit 21 to display the settlement screen prompting the user to settle by the settlement method that was selected on the settlement method selection screen (Step B10). Upon receiving this instruction, display unit 21 displays the settlement screen. In the case of electronic money settlement, this settlement screen is a screen prompting the user to touch the IC (Integrated Circuit) card, in which an electronic money function has been installed, against the screen.

At the time point of Step B10, although the charging of EV 10 has already started, the progress of charging cannot be seen on the settlement screen. In other words, the fact that charging has started is not visible on the settlement screen. It is thought that by displaying a settlement screen of this type, the user, wanting charging to start, will take the initiative and carry out settlement (in the case of electronic money settlement, by touching the IC card against the screen).

Control unit 24 further instructs settlement unit 23 to settle the usage fees of EV charger 20 by the settlement method that was selected on the settlement method selection screen (Step B11). Upon receiving this instruction, settlement unit 23 settles by the settlement method that was selected on the settlement method selection screen. For example, in the case of electronic money settlement, when the IC card is placed in contact with the screen, settlement unit 23 reads the information (electronic money, user information, etc.) that is necessary for settlement from the IC card and settles based on the information that was read.

Control unit 24 then instructs settlement unit 23 to settle and then monitors whether settlement is carried out by settlement unit 23 within the waiting time that was determined according to the settlement method that was selected on the settlement method selection screen (Steps B12 and B13).

The implementation of settlement in an electronic money settlement refers to EV charger 20 normally reading information such as the information of the amount of money and the user information from an IC card in which the electronic money function has been loaded and the usage fees is then paid.

The implementation of settlement in prepaid card settlement refers to EV charger 20 normally reading the information of the amount of money from the prepaid card and the usage fees then being paid.

The implementation of settlement in credit card settlement refers to normally reading the user information and credit card number from the credit card and then successfully authenticating the user (in actuality, this implementation does not refer to payment by direct debit from a bank account).

The implementation of settlement in cash settlement refers to EV charger 20 recognizing that the amount of money of the usage fees has been submitted to EV charger 20.

When settlement has not been implemented within the waiting time ("Yes" in Step B13), control unit 24 instructs power supply unit 22 to forcibly halt the supply of electric power to EV 10 (Step B14). Upon receiving this instruction, power supply unit 22 halts the supplying of electric power to EV 10.

In addition, control unit 24 instructs display unit 21 to display an error screen indicating that settlement could not be normally implemented (Step B15). Upon receiving this instruction, display unit 21 displays the error screen. After the display of this error screen has been displayed, unplugging and plugging of the charging connector becomes possible, the process returns to Step B1, and the start screen is displayed.

On the other hand, when settlement is implemented within the waiting time ("Yes" in Step B12), control unit 24 instructs display unit 21 to display a settlement completion screen indicating that settlement was implemented normally (Step B16). Upon receiving this instruction, display unit 21 displays the settlement completion screen.

Control unit 24 further instructs power supply unit 22 to select, as the power supply speed, a second speed that is a higher speed than the first speed (Step B17). Upon receiving this instruction, power supply unit 22 increases the speed of supplying electric power to EV 10 to the second speed.

Control unit 24 further instructs display unit 21 to display a charging start screen indicating that charging has started (Step B18). Upon receiving this instruction, display unit 21 displays the charging start screen.

Although charging EV 10 had already started at the time point of Step B18, the user judges that charging has started at this time point on the basis of the display of the charging start screen.

Subsequently, upon receiving an instruction to terminate charging from EV 10 ("Yes" in Step B19), control unit 24 instructs power supply unit 22 to halt the supplying of electric power to EV 10 (Step B20). Upon receiving this instruction, power supply unit 22 halts the supplying of electric power to EV 10.

In addition, control unit 24 instructs display unit 21 to display a charging completed screen indicating that charging has been completed (Step B21). Upon receiving this instruction, display unit 21 displays a charging completed screen. After the charging completed screen has been displayed, unplugging and plugging of the charging connector again becomes possible, the process again returns to Step B1, and the start screen is displayed.

In the present exemplary embodiment as described hereinabove, usage fees are settled after the supply of electric power to EV charger 20 has started. As a result, the effect can be obtained that refunding of usage fees can be prevented from occurring.

In addition, according to the CHAdeMO standard, the start and termination of charging cannot be controlled from the EV charger 20 side. Accordingly, in EV charger 20 of the CHAdeMO standard, there is no requirement to provide a rest point for settlement before or after the start of charging, and a rest point before or after the start of charging therefore cannot be provided, as in Patent Document 1. As a result, charging is started without settlement and the possibility arises that nonpayment of usage fees cannot be prevented.

In response, EV charger 20 in the present exemplary embodiment makes the timing for settlement of usage fees a timing after the start of supplying electric power to EV 10 (without taking a rest point). As a result, the effect is obtained in which the occurrence of a refund of usage fees can be prevented, and further, that the nonpayment of usage fees can be more effectively prevented compared to a case in which the timing for settling usage fees is provided after the termination of charging.

In addition, EV charger 20 forcibly terminates charging if settlement is not completed within the waiting time. The effect is therefore obtained of enabling limiting the amount of electric power supplied to EV 10 for which usage fees have not been paid.

In addition, before starting to supply electric power to EV 10, EV charger 20 displays a settlement preparation screen prompting the user to prepare for settlement. As a result, the user is ready to immediately carry out settlement within the waiting time and the effect is obtained of enabling avoidance of a case in which settlement is not possible within the waiting time and supplying electric power is forcibly halted. Still further, because the user is able to immediately carry out settlement within the waiting time, it is conceivable that the waiting time can be made shorter, whereby the effect is obtained in which the amount of electric power supplied to EV 10 for which usage fees are not paid can be further limited.

EV charger 20 determines the waiting time in accordance with the settlement method that was selected by the user. For example, in the case of electronic money settlement for which settlement is considered to be carried out in a shorter time than cash settlement, the waiting time can be made shorter, and the effect is therefore obtained in which the amount of electric power supplied to EV 10 for which usage fees have not been paid can be further limited.

EV charger 20 carries out charging at a low speed (the first speed) in the interval up to the implementation of settlement and then carries out charging at high speed (the second speed) after settlement has been carried out. As a result, the effect is obtained of enabling an even greater limit on of the amount of electric power supplied to EV 10 for which usage fees have not been paid.

In addition, EV charger 20 displays a settlement screen that prompts the user to settle in the interval up to settlement. In this way, even though charging is actually proceeding, the display of this settlement screen has the effect of prompting the user, who wants charging to start, to take the initiative and settle.

Although the present invention has been described hereinabove with reference to the present exemplary embodiment, the present invention is not limited to the above-described exemplary embodiment. The configuration and details of the present invention are open to various modifications within the scope of the present invention that will be clear to one of ordinary skill in the art.

For example, in the above-described exemplary embodiment, the display timing of displaying the settlement method selection screen and the settlement preparation screen was a timing that preceded connection of the charging connector of EV charger 20 to EV 10, but the present invention is not limited to this form, and the display timings may be after connecting the charging connector of EV charger 20 to EV 10. However, in this case, the starting point of the waiting time in EV charger 20 is the timing at which the supplying of electric power actually starts. In addition, in this case, there is the possibility that before the display of the settlement method selection screen and the settlement preparation screen, the supplying of electric power from EV charger 20 will already have been started by an instruction from EV 10. As a result, when the settlement method is selected, the length of the waiting time that has already started is altered according to the settlement method that is selected.

Further, although the charging method of EV 10 was assumed to be a charging method of the CHAdeMO standard in the above-described exemplary embodiment, the present invention is not limited to this form and can be applied to a charging method other than the CHAdeMO standard.

In other words, the present invention can also be applied to a charging method in which the start and termination of charging is controlled from the EV charger 20 side. For example, it is assumed in this case that instructions for the start and termination of charging from the user are received by way of the console (not shown) of EV charger 20, and the processes following Step B6 of FIG. 3 should be carried out when an instruction to start charging is received, and the processes after Step B20 of FIG. 4 should be carried out when an instruction to terminate charging is received.

In the above-described exemplary embodiment, the usage fees of EV charger 20 were assumed to be a fixed rate (flat sum system) regardless of the amount of electric power supplied, but the present invention is not limited to this form, and the usage fees may also be determined according to the amount of supplied electric power. However, because settlement is carried out before the termination of charging in the present invention, the usage fees must be established at least before the termination of charging. As a case in which the usage fees are established before the termination of charging, a case can be considered in which, for example, the amount of electric power that is to be supplied is set at the beginning, following which charging commences.

Further, in the present exemplary embodiment, the starting point of the waiting time in EV charger 20 is taken to be the time when the supplying of electric power to EV 10 begins from the charging connector of EV charger 20. However, "the starting point of the waiting time" in the present invention is not limited to this form, and may for example be: the timing at which the user selects the settlement method; the timing of instructing the start of the supplying of electric power to power supply unit 22; the timing at which it is confirmed that the supplying of electric power has actually started; or the timing at which settlement unit 23 is instructed to implement settlement after both the connection of the charging connector to EV 10 and selection of the settlement method of the user have been completed (either may be completed first).

Although EV charger 20 displays a settlement method selection screen on display unit 21 at the time of the selection of the settlement method in the above-described exemplary embodiment, the present invention is not limited to this form, and the settlement method selection screen may not necessarily be displayed on display unit 21. For example, the settlement method may be recognized and the recognized settlement method then taken as the selected method at the time point when cash is submitted or at the time point when an IC card that is equipped with the electronic money function or a credit card is placed in contact with the screen (reader).

Although EV charger 20 was assumed to be capable of implementing settlement by a plurality of settlement methods in the above-described exemplary embodiment, the present invention can also be applied to a charger that is capable of implementing settlement by only one settlement method (such as only cash settlement, or only credit card settlement). Because there is only one settlement method in the case of this type of charger, the processes of Steps B2 and B3 of FIG. 3 can be omitted, and in the Steps B12 and B13 of FIG. 3, when the settlement has not been implemented within a predetermined time interval after a predetermined timing (for example, the timing when supplying electric power from the charging connector of EV charger 20 to EV 10 has started, the timing when power supply unit 22 is instructed to start the supplying of electric power, or the timing of confirmation that the supplying of electric power has actually started), the procedure may advance to the process of Step S14 of FIG. 3, and the supplying of electric power may be forcibly halted.

In the above-described exemplary embodiment, when settlement has not been carried out within the waiting time, EV charger 20 forcibly halted the supplying of electric power, but the present invention is not limited to this form, and the supplying of electric power may also be forcibly halted according to the SOC of secondary battery 11. For example, the supplying of electric power may be forcibly halted when settlement has still not been carried out even though the amount of electric power supplied to secondary battery 11 has reached a predetermined amount (for example, 5% of the full charge amount of secondary battery 11). Further, in the above-described exemplary embodiment, the charger of the present invention is applied to EV charger 20 that carries out charging of secondary battery 11 of EV 10, but the present invention is not limited to this form. The charger of the present invention may also be applied to a charger that carries out charging of a secondary battery of, for example, an electric motorcycle, a power-assisted bicycle, a PC (Personal Computer), or a portable apparatus.

Finally, an outline of the present invention is described.

Figure 5:
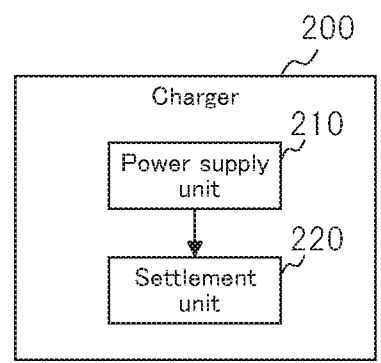
FIG. 5 is a block diagram that shows an outline of the configuration of the charger of the present invention.

FIG. 5 shows an outline of charger 200 of the present invention.

As shown in FIG. 5, charger 200 of the present invention includes power supply unit 210 and settlement unit 220.

Power supply unit 210 carries out charging of a secondary battery.

The secondary battery for which power supply unit 210 performs charging is the secondary battery of, for example, an electric vehicle, an electric motorcycle, a power-assisted bicycle, a PC, or a portable apparatus.

Settlement unit 220 settles the usage fees of charger 200 after the supplying of electric power to the secondary battery has started and before the termination of charging.

The termination of charging refers to, for example, the point when the amount of charging of the secondary battery has reached a predetermined amount (in the case of a rapid charger, this is when the charging rate of the secondary battery has reached 80%), or, when the amount of supplied electric power is first set and charging then started, the point when the electric power that has been supplied reaches this amount of supplied electric power.

In charger 200 of the present invention, settlement unit 220 settles the usage fees of charger 200 after starting to supply electric power to a secondary battery and before the termination of charging.

As a result, the effect is obtained in which refund of the usage fees of charger 200 can be prevented from occurring.

This application claims the benefits of priority based on Japanese Patent Application No. 2013-209976 for which application was submitted on Oct. 7, 2013 and incorporates by citation all of the disclosures of that application.

What is claimed is:

1. A charger comprising:
   a power supply unit that supplies electric power to a secondary battery; and
   a settlement unit that settles usage fees of a charger after supplying electric power to said secondary battery has started but before termination of charging,
   wherein said power supply unit supplies electric power at a first electric power supply speed during a time interval from the start of the supplying of electric power to said secondary battery until said settlement has been carried out by said settlement unit, and supplies electric power at a second electric power supply speed that is faster than said first electric power supply speed after said settlement has been carried out by said settlement unit.

2. The charger as set forth in claim 1, wherein said settlement unit is capable of carrying out said settlement by a plurality of settlement methods, and carries out said settlement by a settlement method selected by a user.

3. The charger as set forth in claim 2, wherein said power supply unit halts the supplying of electric power to said secondary battery if said settlement was not carried out by said settlement unit despite the passage of a time interval that depends on said settlement method after the supplying of electric power to said secondary battery has started.

4. The charger as set forth in claim 2, wherein said power supply unit halts the supplying of electric power to said secondary battery if said settlement was not carried out by said settlement unit despite the passage of a time interval that depends on said settlement method after said settlement method was selected.

5. The charger as set forth in claim 1, wherein said power supply unit halts the supplying of electric power to said secondary battery if said settlement was not carried out by said settlement unit despite the passage of a predetermined time interval.

6. The charger as set forth in claim 1, wherein said power supply unit halts the supplying of electric power to said secondary battery if said settlement was not carried out by said settlement unit despite the supplying of a predetermined amount of electric power to said secondary battery.

7. The charger as set forth in claim 1, further comprising a display unit that displays a screen prompting a user to prepare for said settlement before said power supply unit starts the supplying of electric power to said secondary battery.

8. The charger as set forth in claim 7, wherein said display unit displays a screen prompting the user to settle in the time interval during which settlement is to be carried out after said power supply unit has started the supplying of electric power to said secondary battery.

9. The charger as set forth in claim 7, wherein said display unit conceals the fact that charging has started until said settlement has been carried out by said settlement unit.

10. A charging method realized by a charger that carries out charging of a secondary battery, comprising:
    a power supply step of supplying electric power to said secondary battery; and
    a settlement step of settling usage fees of said charger after the supplying of electric power to said secondary battery has started but before charging has terminated,
    wherein in said power supply step, electric power is supplied at a first power supply speed in a time interval from the start of supplying electric power to said secondary battery until said settlement is carried out and electric power is supplied at a second power supply speed that is faster than said first power supply speed after said settlement has been carried out.

11. The charging method as set forth in claim 10, wherein in said settlement step, said settlement is possible by a plurality of settlement methods, and said settlement is carried out by a settlement method that is selected by a user.

12. The charging method as set forth in claim 11, wherein in said power supply step, supplying electric power to said secondary battery is halted if said settlement has not been carried out despite the passage of a time interval that depends on said settlement method after the supply of electric power to said secondary battery has started.

13. The charging method as set forth in claim 11, wherein in said power supply step, the supplying of electric power to said secondary battery is halted if said settlement has not been carried out despite the passage of a time interval that depends on said settlement method after said settlement method was selected.

14. The charging method as set forth in claim 10, wherein in said power supply step, the supplying of electric power to said secondary battery is halted if said settlement is not carried out despite the passage of a predetermined time interval.

15. The charging method as set forth in claim 10, wherein in said power supply step, the supplying of electric power to said secondary battery is halted if said settlement is not carried out despite the supplying of a predetermined amount of electric power to said secondary battery.

16. The charging method as set forth in claim 10, further comprising a step of displaying a screen prompting a user to prepare for said settlement before the supplying of electric power to said secondary battery has started.

17. The charging method as set forth in claim 16, further comprising a step of displaying a screen prompting the user to make said settlement in the time interval from the start of supplying of electric power to said secondary battery until said settlement has been carried out.

18. The charging method as set forth in claim 16, wherein the fact that charging has started is concealed during the time interval until said settlement has been carried out.

* * * * *